United States Patent [19]

Van Wijk

[11] Patent Number: 4,872,990
[45] Date of Patent: Oct. 10, 1989

[54] MEMBRANE MODULE FOR HYPERFILTRATION OR ULTRAFILTRATION OF CONTAMINATING LIQUID FLOWS

[75] Inventor: Hendrik F. Van Wijk, Ce Zeist, Netherlands

[73] Assignee: Nederlandse Organisatie voor Toegepast-Natuurwetenschappelijk Onderzoek TNO, The Hague, Netherlands

[21] Appl. No.: 242,721

[22] Filed: Sep. 9, 1988

[30] Foreign Application Priority Data

Sep. 9, 1987 [NL] Netherlands ............... 8702149

[51] Int. Cl.$^4$ ............................................ B01D 13/00
[52] U.S. Cl. ................................ 210/644; 210/650; 210/321.74; 210/321.83
[58] Field of Search ........... 210/494.1, 321.83, 321.74, 210/321.84, 321.85, 634, 644, 649, 650, 651, 652

[56] References Cited

U.S. PATENT DOCUMENTS

| | | | |
|---|---|---|---|
| 3,893,920 | 7/1975 | Hubbard et al. | 210/321.84 |
| 3,984,319 | 10/1976 | Hubbard et al. | 210/321.84 |
| 4,301,013 | 11/1981 | Setti et al. | 210/321.83 |
| 4,746,430 | 5/1988 | Cooley | 210/321.85 |
| 4,756,835 | 7/1988 | Wilson | 210/321.83 |
| 4,781,830 | 11/1988 | Olsen | 210/321.83 |

*Primary Examiner*—Frank Sever
*Attorney, Agent, or Firm*—William H. Elliott, Jr.; Richard L. Hansen

[57] ABSTRACT

A membrane module for hyperfiltration or ultra filtration of liquid flows comprises a membrane envelope (1) spirally wound around a tube (4) provided with openings and the membrane layers of which are alternately kept at a distance from each other by retentate spacers and permeate spacers (2), which retentate spacers comprise relatively rigid rods or wires (3) extending parallel to the center line of the module. In order to obtain a very constant and defined geometry of the retentate flow channels and a favorable ratio between membrane surface and module volume, the width dimension of the rods measured perpendicular to the membrane layers is 0.5 to 2.5 mm and the distance between the rods is 4 to 12 times said width dimension. Said width dimension of the rods measured perpendicular to the membrane layers should be at least three times the diameter of the largest particles in the liquid flow to be filtered.

18 Claims, 4 Drawing Sheets

MEMBRANE MODULE FOR HYPERFILTRATION OR ULTRAFILTRATION OF CONTAMINATING LIQUID FLOWS

The invention relates to a membrane module for hyperfiltration (reverse osmosis) or ultrafiltration of liquid flows, comprising a membrane envelope which is spirally wound around a tube provided with openings and the membrane layer of which are alternately kept at a distance from each other by retentate spacers and permeate spacers, which retentate spacers comprise relatively rigid rods or wires extending parallel to the centre line of the module. Such a membrane module is described in EU-A- 0,146,298.

In applying reverse osmosis or ultrafiltration to liquid flows which could contaminate the membrane considerably, in particular, flows which contain solid particles and/or colloidal material, use is usually made of tubular membrane modules having a diameter in the range between 5 and 15 mm. An important advantage of said tubular membrane modules is that they are not susceptible to blockage. By using high liquid velocities along the membrane surface, a turbulent liquid flow is obtained, as a result of which contamination of the membrane surface is limited. Tubular membrane modules have, however, an unfavorable ratio between membrane surface and module volume (between 50 and 150 m2/cm3). The liquid capacity is also relatively large and this presents a problem if the modules have to be cleaned: large quantities of cleaning agents have to be used. With strongly contaminating flows, daily cleaning of the membrane modules is quite normal. The flows of waste which are the consequence thereof often present an environmental problem. In tubular modules, the costs of cleaning materials may amount to 20% of the operating costs.

The module according to EU-A-0,146,298 is intended for processing viscous liquids which in principle contain no solid particles and/or colloidal material. The rods of these known modules have a diameter of 2.5 mm and a spacing between the rods of approximately 5 cm. The geometry resulting therefrom of the retentate flow channels is undefined in view of the normal flexibility of the membranes. In fact, the membrane layers succeeding each other in the winding will be closer to each other in the winding at the midpoint between two rods than at the position of the rods. The object of the known module is to reduce the pressure drop across the module. Use of said module for filtration of liquids containing solid particles and/or colloidal material would have the result that said particles or said colloidal material could settle in the central region between the rods and could cause blockage. In addition, the packing density of this known module is too low and the energy consumption during filtration too high.

The object of the invention is to provide a membrane module described in the introduction which has a favorable ratio between membrane surface and module volume, which has a very constant and defined geometry of the retentate flow channels and which is not susceptible to blockage.

According to the invention the module is characterized in that the width dimension of the rods measured perpendicular to the membrane layers is 0.5 to 2.5 mm and the distance between the rods is 4 to 12 times said width dimension.

If the width dimension of the rods measured perpendicular to the membrane layers (in the case of round rods, that is the diameter) is less than 0.5 mm there is too great a chance of blockage. A width dimension greater than 2.5 mm results in a too unfavorable ratio between membrane surface and module volume. A too large distance between the rods (greater than twelve times the rod width or rod diameter) entails, as stated in the discussion of EU-A-0,146,298, an undefined flow and a risk of blockage. Too small a distance between the rods again results in a poor surface:volume ratio.

Spirally wound membrane modules, the spacers of which, on the retentate side of the membrane, comprise a fabric, web or gauze are also unsuitable for treating strongly contaminating liquids containing particles, since contamination readily occurs in the dead corners of the structure of the spacers. If wires or rods placed parallel to the flow direction are used, parallel channels having smooth walls are produced in which the chance of blockage is extremely small.

It has been measured that no blockage of the module occurs if the width of the gap between the membrane layers in which the liquid to be treated flows is kept by rods or wires at a value which is at least three times the diameter of the largest particles in the liquid flow fed in.

For many applications, the rods have a diameter of at least 1 mm while the spacing of the rods is approximately six times their diameter.

The favorable surface/liquid capacity ratio of the module results in such high shear-plane velocities in the module that a low contamination of the membrane surface occurs, accompanied by a laminar flow pattern. The laminar flow pattern also has a great advantage in energy consumption compared with the tubular module with turbulent operation. An advantage of spacing the wires or rods is, furthermore, that the loss of membrane surface due to the spacer itself is low. Where the spacer presses against the membrane surface, the membrane does not function.

If the rods are anchored outside the wound membrane envelope, the membrane windings of the envelope cannot slide out of each other under the influence of high axial flow velocities of the retentate, while the anchoring cannot cause any blockage.

For example, end parts of the rods projecting outside the wound membrane envelopes are embedded in a disc.

The invention further relates to a filtration device for hyperfiltration or ultrafiltration of liquid flows, which device comprises a housing with at least one cylindrical cavity in which an above-described membrane module is accommodated, which housing is provided with a feed-stock inlet, a permeate discharge and a retentate discharge.

A plastic sheath, the ends of which are sealed with O-rings with respect to the housing can be provided around the wound module.

A further possibility is that the outermost membrane winding is kept at a small distance from the housing by the rod-type retentate spacers to form a gap through which flow can take place.

Several modules can be placed behind each other in a housing. In this case the anchoring bodies of the rods are provided with openings through which flow can take place and the housing furthermore has a feed-stock inlet, a permeate discharge and a retentate discharge.

Finally, the invention relates to a method for purifying, by hyper- or ultrafiltration, contaminating liquid flows containing solid particles, in which the liquid to be purified is fed into the feed-stock inlet of the above-described filtration device and flows in the gaps between the membrane layers, the gap width of which is kept by the said rods or wires at a value which is at least three times the diameter of the largest particles in the liquid flow fed in.

The rods preferably have a diameter of at least 1 mm and the centre-to-centre spacing of the rods is approximately six times the diameter of the rods.

The invention will now be explained in more detail with reference to the figures.

The invention is intended for ultrafiltration or hyperfiltration of contaminating liquid flows. Examples of liquids to be treated are blood plasma, skimmed milk, cheese whey, paint suspensions and slurries in general. The device is suitable, in particular, for liquids which contain solid particles and/or colloidal material.

An envelope 1 of flat membranes is glued at three sides while the fourth side remains open. Inside the envelope closed at three sides a compression-resistant-permeate spacer in the form of impregnated tricot 2 is provided, while a retentate spacer 3 in the form of a multiplicity of parallel rods situated at a distance from each other is placed or securely glued on the envelope. This entity is wound onto a perforated tube 4 (for example, of stainless steel) in a manner such that the open side of the envelope is joined to the tube 4. The possibility exists for arranging for the gluing of the longitudinal edges of the membrane envelope to be carried out at the same time as the winding.

Figure 1:
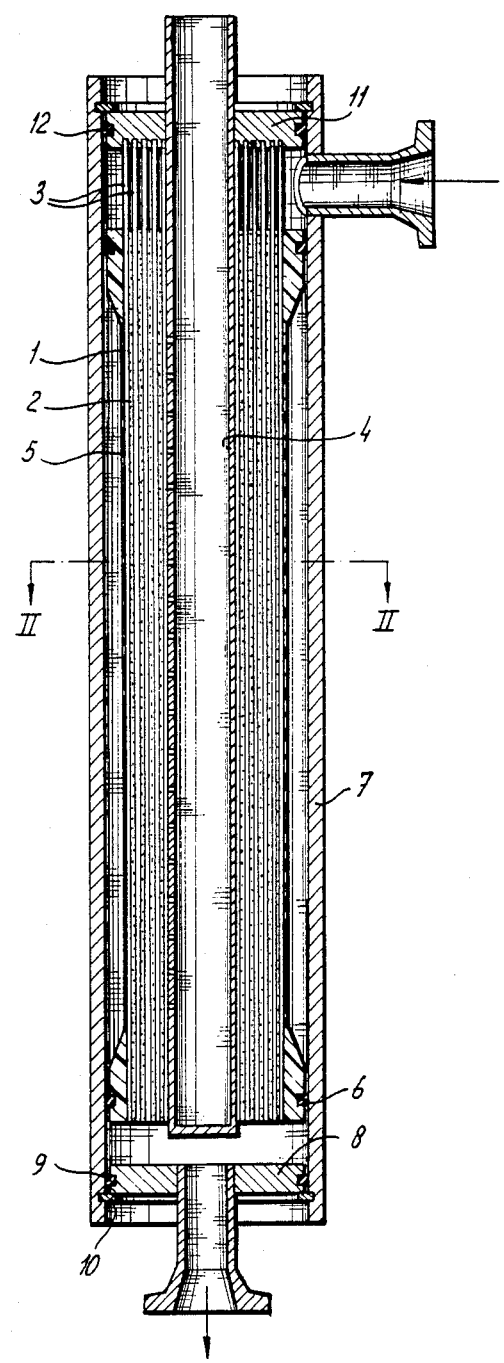
FIG. 1 shows a longitudinal section of a filter device according to the invention.
Figure 2:
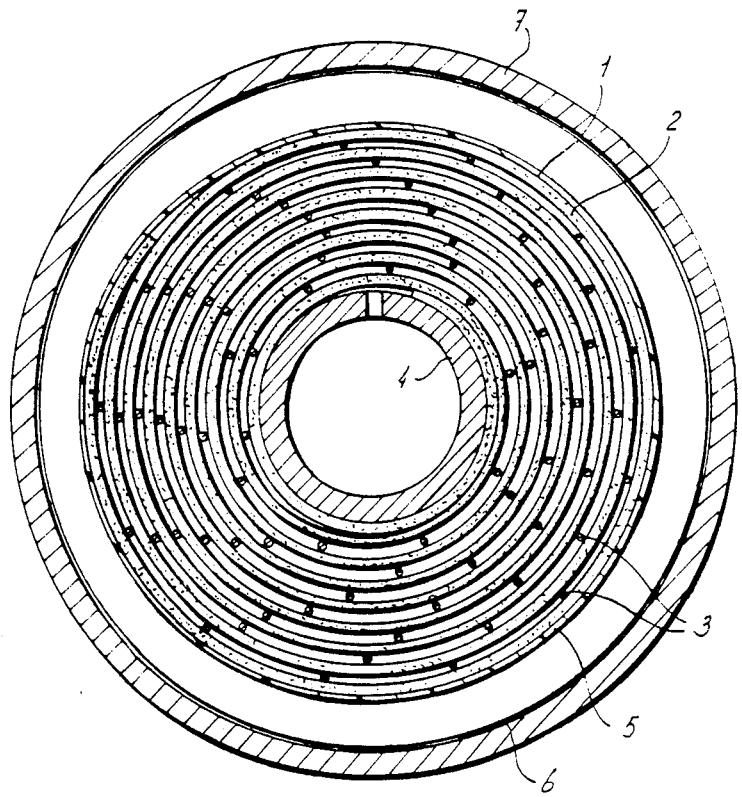
FIG. 2 shows a cross section along the line II-II in FIG. 1.

In the construction according to FIGS. 1 and 2, a thin sheath 5 (for example, having a thickness of 1 mm) composed of glass-fibre reinforced plastic is fitted around the wound module. The thickness of said sheath is increased at the ends (for example, to approximately 9 mm). Situated in these thickened regions are O-rings 6 which serve to seal the module with respect to a glass fibre reinforced plastic or stainless steel outer sheath 7, the so-called housing. One end of said outer sheath 7 is closed off with a stainless steel plate 8 which is likewise sealed with an O-ring 9 and is secured by a seeger ring 10. The other end of the outer sheath 7 is closed off by an epoxy disc 11 in which the ends of the rods or wires of the retentate spacer are embedded. This disc is also provided with an O-ring 12. The epoxy disc holds the rods in position. The disc is pressure-loaded during operation. If there may be a risk of the disc bursting, a stop plate for the rods may be placed at the other end of the rods. Instead of embedding in an epoxy disc, other plastics may be used and it is also possible to mount the rods on a metal disc, for example on the end plate of a module tube.

Figure 3:
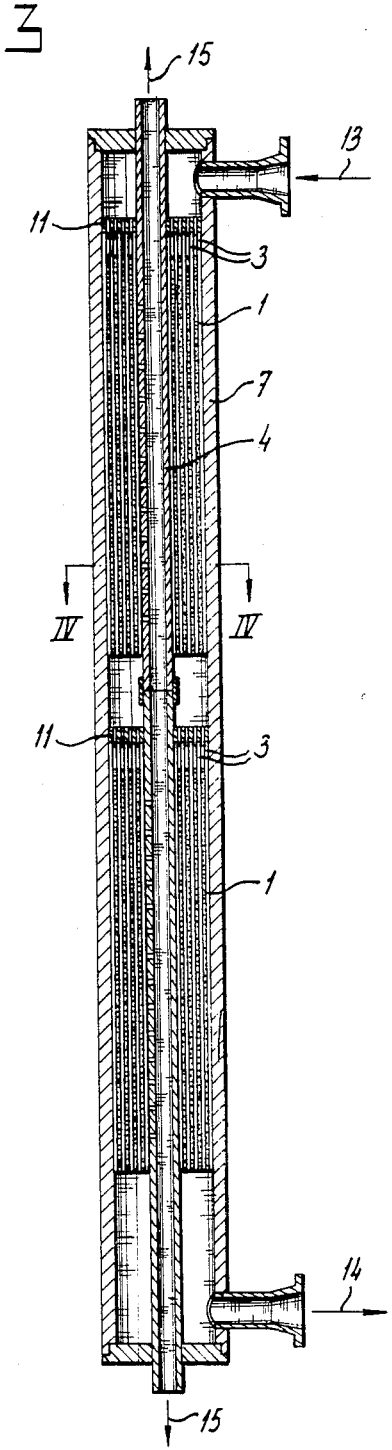
FIG. 3 shows a longitudinal section
Figure 4:
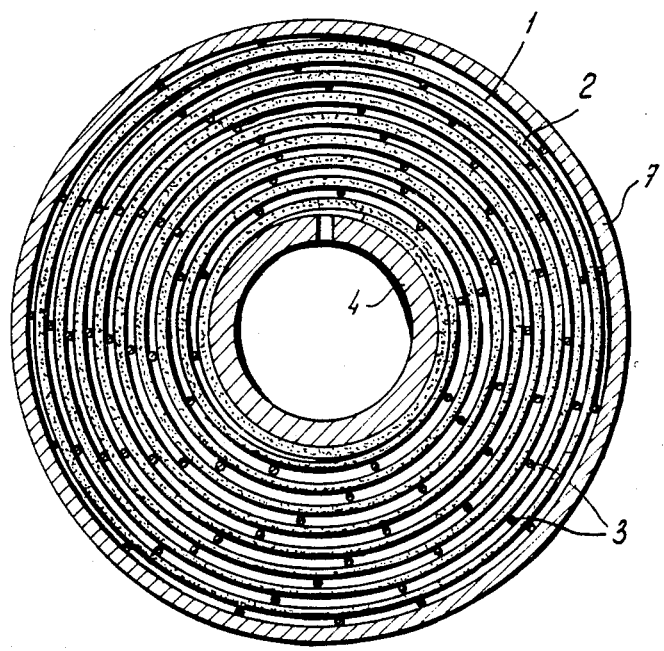
FIG. 4 shows a section along the line IV—IV in FIG. 3.

FIGS. 3 and 4 show a construction in which no plastic sheath reinforced with glass fibre is used around the module, but in which the rod-type retentate spacers themselves form a seal, through which flow can take place, between the outermost winding and the outer sheath. For some sanitary applications, such an embodiment through which cleaning liquids can also flow is to be preferred. In addition, the membrane surface/volume ratio of the module is thereby increased still further. FIG. 4 shows the possibility of using a body through which flow can take place as a lattice for anchoring the rods instead of a plastic or metal disc 11, as a result of which a number of modules can be placed in series inside an outer sheath 7 in a simple manner.

The outer sheath 7 is provided with an inlet nozzle 13. The central tube 4 has a discharge 15 for discharging permeate while a discharge 14 is provided for discharging retentate.

The liquid supplied via the nozzle 13 is kept under pressure, for example a pressure of 1 or $2 \times 10^6$ Pa, in the gaps between the membrane envelope layers kept at a distance by the rods 3. Permeate gets into the permeate spacer inside the membrane envelope, follows the spiral winding of said envelope inwards and eventually flows into the central tube 4 where it is discharged via the nozzle 15.

The most important advantage of the device described is that the ratio between surface and volume is very favorable (between 400 and 600 m2/m$^3$ with respect to 50-150 m2/m3 for the existing device). As a consequence of the construction of the retentate spacer in the form of the relatively rigid rods or wires, a good flow parallel to the rod direction along the membrane surfaces can be obtained with very little risk of blockage. The gap width should be at least three times the diameter of the largest particles in the liquid.

To summarize, a very low degree of contamination is achieved despite the fact that the device is suitable for treating liquids containing relatively large particles (up to at least 0.8 mm). The compression-resistance (especially important for reverse osmosis) is satisfactory. It is possible to ensure good thermal stability. The operating costs of a system with spirally wound modules are at least 10% lower than those of a system containing tubular modules.

EXAMPLE 1

A spirally wound module with the following characteristics was used:
gap width: 1 mm;
Membrane: Filmtec FT-30 hyperfiltration membrane;
Estimated effective surface: 0.27 m2;
Single spacer on the permeate side;
Estimated pump round rate: 5 m3/hour.

A suspension of PVC particles having a diameter between 0.1 mm and 0.3 mm was introduced into the system, a 2% by weight, a 4% by weight and an 8% by weight suspension being used in succession. A pressure of $2 \times 10^6$ Pa was employed. A small percentage (approximately 0.1% by weight) of NaCl was added to the suspension. The measurement results with regard to flux and NaCl retention were as follows:

| Feed-stock (%) | Pressure (Pa) | Flux (1/m2/hour) | NaCl Retention | Time (min.) |
| --- | --- | --- | --- | --- |
| 2% by weight of PVC particles (0.1–0.3 mm) 0.1% by weight NaCl, steady | $2 \times 10^6$ | 13.3 | 92.0 | 180 |
| | $2 \times 10^6$ | 13.3 | 91.4 | 240 |
| 4% by weight of PVC particles (0.1–0.3 mm) 0.1% by weight NaCl, steady | $2 \times 10^6$ | 16.4 | 85.0 | 240 |
| 8% by weight of PVC particles (0.1–0.3 mm) | $2 \times 10^6$ | 18.9 | 75.0 | 60 |
| | $2 \times 10^6$ | 20.0 | 73.0 | 120 |

-continued

| Feed-stock (%) | Pressure (Pa) | Flux (1/m2/hour) | NaCl Retention | Time (min.) |
| --- | --- | --- | --- | --- |
| 0.1% by weight NaCl, steady after removal of PVC particles, 0.1% by weight NaCl | $2 \times 10^6$ $2 \times 10^6$ | 20.4 20.7 | 70.0 72.0 | 30 60 |

EXAMPLE 2

A spirally wound module with the following characteristics was used:
gap Width: 1 mm
Membrane: Filmtec FT-30 hyperfiltration membrane;
Estimated effective surface: 0.26 m2;
A double permeate spacer.

A yeast cake suspension was introduced into the system. The percentage by weight of yeast cake was increased from 25% by weight to 90% by weight. The measurement results with regard to flux and NaCl retention were as follows:

| Feed-stock (%) | Pressure (Pa) | Flux (1/m2/hour) | NaCl Retention | Time (min.) |
| --- | --- | --- | --- | --- |
| 25% by weight of yeast cake, 0.1% by weight of NaCl, steady | $2 \times 10^6$ $2 \times 10^6$ $2 \times 10^6$ $2 \times 10^6$ $2 \times 10^6$ | 8.8 8.8 8.8 8.1 8.5 | 77.0 79.0 82.0 86.0 86.0 | 15 30 60 90 115 |
| After removing yeast cake, pumped circulation rate halved to 2.5 m-3, hour | $2 \times 10^6$ | 9.9 | 82.0 | 30 |
| 25% by weight of yeast cake. Concentration to 50% by weight of yeast cake, 0.1% by weight of NaCl | $2 \times 10^6$ $2 \times 10^6$ $2 \times 10^6$ $2 \times 10^6$ | 9.2 8.5 8.0 7.8 | — — — — | 30 60 90 115 |
| After tapping off, 40% by weight of yeast cake. Concentration to 70% by weight of yeast cake, 0.05% by weight of NaCl | $2 \times 10^6$ $2 \times 10^6$ $2 \times 10^6$ $2 \times 10^6$ | 9.2 9.2 9.2 9.5 9.7 | — — — — 91.0 | 15 30 60 80 |
| After tapping off, 65% by weight of yeast cake. Concentration to 90% by weight of yeast cake. T = 44° C., gas evolution in permeate, 0.1 by weight of NaCl | $2 \times 10^6$ | 4.2 | 81.1 | t (final) |
| After tapping off, 0.1% by weight NaCl | $2 \times 10^6$ | 9.7 | 86.2 | |

Various modifications of the module shown and described are possible within the scope of the claims. Essential to the inventive idea is that use can be made of a spirally wound module for hyperfiltration or ultra filtration without there being a risk of blockage if the geometry of the retentate channels is such that the chance of blockage is low. This geometry is achieved by means of retentate spacers which comprise axially extending, relatively rigid rods or wires.

I claim:

1. Membrane module comprising: means for hyperfiltration or ultrafiltration of particulate-containing liquid flows including an envelope of membrane layers spirally wound around a tube provided with openings, said membrane layers being alternately separated by retentate spacers and permeate spacers, said retentate spacers comprising relatively rigid rods or wires extending parallel to the center line of said module, the width dimension of said rods measured perpendicular to said membrane layers being about 0.5 to 2.5 mm and the distance between said rods being about four to about twelve times said width dimension.

2. Membrane module according to claim 1 wherein the width dimension of said rods measured perpendicular to said membrane layers is at least about three times the diameter of the largest particles in the liquid flows to be filtered.

3. Membrane module according to claim 2 wherein said rods are anchored outside said wound membrane envelope.

4. Membrane module according to claim 3 wherein ends of said rods projecting outside said wound membrane envelope are embedded in a disc.

5. Filtration device for hyperfiltration or ultrafiltration of particulate-containing liquid flows comprising a housing having at least one cylindrical cavity in which a membrane module according to one of claims 1 to 4 is accommodated, said housing being provided with a feed-stock inlet, a permeate discharge and a retentate discharge.

6. Filtration device according to claim 5 wherein a tubular plastic sheath is provided around said membrane module, together with O-rings to seal said sheath with respect to said housing.

7. Filtration device according to claim 5 wherein the outermost winding of said membrane module is separated from said housing by said retentate spacers, forming a gap through which flow can take place.

8. Membrane module according to claim 1 wherein said rods are anchored outside said wound membrane envelope.

9. Membrane module according to claim 8 wherein ends of said rods projecting outside said wound membrane envelope are embedded in a disc.

10. Filtration device for hyperfiltration or ultrafiltration of particulate-containing liquid flows comprising a housing having at least one cylindrical cavity, a multiplicity of membrane modules according to claim 8 wherein said rods are anchored outside said wound membrane envelope in series within said cavity, flow openings being provided between said modules, and said housing further including a feed-stock inlet, a permeate discharge and a retentate discharge.

11. Method for purifying comprising: hyperfiltering or ultrafiltering
contaminating liquid flows containing solid particles by providing a membrane module including an envelope of membrane layers spirally wound around a tube provided with openings, said membrane layers being alternately separated by retentate spacers and permeate spacers, said retentate spacers comprising relatively rigid rods or wires extending parallel to the center line of said module, the width dimension of said rods measured perpendicular to said membrane layers being about 0.5 to 2.5 mm and the distance between said rods being about four to about twelve times said width dimension,
feeding the liquid to be purified under pressure into the feed-stock inlet of a filtration device comprising a housing having at least one cylindrical cavity in which said membrane module is accommodated, said housing also being provided with a feed-stock inlet, a permeate discharge and a retentate discharge, and the liquid flows in the spaces between said membrane layers, the distance between layers maintained by said retentate spacers being at least three times the diameter of the largest particles in the liquid flow fed in.

12. Method for purifying, by hyperfiltration or ultrafiltration, contaminating liquid flows containing solid particles which comprises feeding the liquid to be purified under pressure into the feed-stock inlet of a filtration device comprising a housing having at least one cylindrical cavity in which a membrane module according to claim 11 is accommodated, said housing also being provided with a feed-stock inlet, a permeate discharge and a retentate discharge, and wherein a tubular plastic sheath is provided around said membrane module, together with O-rings to seal said sheath with respect to said housing, whereby the liquid flows in the spaces between said membrane layers, the distance between said layers maintained by said retentate spacers being at least three times the diameter of the largest particles in the liquid flow fed in.

13. Method according to claim 12 wherein said rods have a diameter of at least about 1 mm and the center-to-center spacing of said rods is approximately six times the diameter of said rods.

14. Method for purifying, by hyperfiltration or ultrafiltration, contaminating liquid flows containing solid particles which comprises feeding the liquid to be purified under pressure into the feed-stock inlet of a filtration device comprising a housing having at least one cylindrical cavity in which a membrane module according to claim 11 is accommodated, said housing also being provided with a feed-stock inlet, a permeate discharge and a retentate discharge, and wherein the outermost winding of said membrane module is separated from said housing by said retentate spacers, forming a gap through which flow can take place, whereby the liquid flows in the spaces between said membrane layers, the distance between layers maintained by said retentate spacers being at least three times the diameter of the largest particles in the liquid flow fed in.

15. Method according to claim 14 wherein said rods have a diameter of at least about 1 mm and the center-to-center spacing of said rods is approximately six times the diameter of said rods.

16. Method for purifying, by hyperfiltration or ultrafiltration, contaminating liquid flows containing solid particles which comprises feeding the liquid to be purified under pressure into the feed-stock inlet of a filtration device comprising a housing having at least one cylindrical cavity in which a multiplicity of membrane modules according to claim 11 is accommodated, and wherein said rods are anchored outside said wound membrane envelope in series within said cavity, flow openings being provided between said modules, said housing also being provided with a feed stock inlet, a permeate discharge and a retentate discharge, whereby the liquid flows in the spaces between said membrane layers, the distance between layers maintained by said retentate spacers being at least three times the diameter of the largest particles in the liquid flow fed in.

17. Method according to claim 16 wherein said rods have a diameter of at least about 1 mm and the center-to-center spacing of said rods is approximately six times the diameter of said rods.

18. Method according to claim 11 wherein said rods have a diameter of at least about 1 mm and the center-to-center spacing of said rods is approximately six times the diameter of said rods.

* * * * *

UNITED STATES PATENT AND TRADEMARK OFFICE
CERTIFICATE OF CORRECTION

PATENT NO. : 4,872,990

DATED : October 10, 1989

INVENTOR(S) : Hendrik F. Van Wijk

It is certified that error appears in the above—identified patent and that said Letters Patent is hereby corrected as shown below:

In col. 6, line 24, "claims 1 to 4" should be --claims 1,2,3, 4,8, or 9--.

Signed and Sealed this

Thirteenth Day of November, 1990

Attest:

HARRY F. MANBECK, JR.

*Attesting Officer*   *Commissioner of Patents and Trademarks*